United States Patent [19]
Kashiwagi

[11] 3,745,246
[45] July 10, 1973

[54] HIGH VOLTAGE PRODUCING CIRCUIT FOR TELEVISION RECEIVERS

[75] Inventor: Shigeru Kashiwagi, Sarushimagun, Ibarogi Pref., Japan

[73] Assignee: Victor Company of Japan, Limited, Kanagawa-ku, Yokohama, Japan

[22] Filed: Apr. 3, 1972

[21] Appl. No.: 240,727

[30] Foreign Application Priority Data
Apr. 3, 1971 Japan ............................ 46/20528

[52] U.S. Cl. ............................ 178/7.5 R, 315/14
[51] Int. Cl. ............................ H04n 3/18
[58] Field of Search .................... 178/7.5 R, 7.3 R, 178/DIG. 11; 315/14; 307/150; 328/258

[56] References Cited
UNITED STATES PATENTS
3,611,002 10/1971 Wedam ........................ 178/7.5 R
3,585,299 6/1971 Boekhorst .................... 178/7.5 R

*Primary Examiner*—Robert L. Griffin
*Assistant Examiner*—Fay I. Konzem
*Attorney*—Richard K. Stevens, Robert J. Frank et al.

[57] ABSTRACT

A high voltage producing circuit for television receivers wherein a voltage-dependent non-linear element is disposed between a circuit for detecting variations in the value of a picture tube current and a control circuit adapted to cause variations to occur in a direct current voltage supply from a direct current source to a flyback transformer upon receipt of output from the detection circuit so as to vary non-linearly the value of the direct current voltage supply to a circuit for supplying pulses to the flyback transformer with respect to a variation in the value of the picture tube current whereby the slope of the characteristics curve of the output of high voltage of the high voltage producing circuit with respect to the picture tube current can be reduced.

6 Claims, 14 Drawing Figures

HIGH VOLTAGE PRODUCING CIRCUIT FOR TELEVISION RECEIVERS

This invention relates to high voltage producing circuits for television receivers, and more particularly it is concerned with a high voltage producing circuit which permits an output of high voltage of fixed value to be produced irrespective of a variation in the value of a picture tube current.

Generally, television picture tubes require a high voltage power source circuit as a power source for operating the picture tube. Needless to say, the high voltage power source circuit for picture tubes is preferably of the type such that an output of high voltage of fixed value can be produced in spite of a wide range of variations in the value of a picture tube current. Particularly in color television receivers in which a variation in the output of high voltage directly affects a variation in beam convergence, it has hitherto been customary to employ, in conventional color television receivers of the vacuum tube type, a so-called shunt regulator circuit using a shunt regulator tube or similar circuit which permits no variation to be produced in the output of high voltage even when a wide range of variations occurs in the value of a picture tube current.

However, it is impossible to incorporate the shunt regulator circuit in wholly transistorized television receivers. This is due to the fact that, at the present state of art, a semiconductor element comparable in performance to the shunt regulator tube used in the television receivers of vacuum tube type is unobtainable.

Therefore, attempts have been made, for example, to employ means to vary a direct current voltage supply to a high voltage producing circuit by the output of a circuit for detecting a variation in the value of a picture tube current in order to obtain an output of high voltage of fixed value even when the value of the picture tube current varies in a wide range in wholly transistorized television receivers. Such attempts have had effect in restricting variations in the output of high voltage to a certain range even when the value of the picture tube current shows wide fluctuations. However, this means has the disadvantage of adversely affecting the operation of television receivers because it has performance characteristics such that initially the output of high voltage suddenly decreases in value when the picture tube current gradually increases in value after starting from zero and then the slope of the characteristics curve of the output of high voltage gradually decreases as the picture tube current increases in value.

When the variation in the output of high voltage incident to the variation in the value of picture tube current is non-linear as aforementioned, the size of the image will undergo a forced change if the brightness control knob of the television receiver is operated to vary the brightness of the picture tube screen. This is not a desirable phenomenon, so that improvements in means for maintaining the output of high voltage at a desired level irrespective of a change in the value of the picture tube current have been pined for.

Accordingly, an object of this invention is to provide a high voltage producing circuit for television receivers which obviates the aforementioned disadvantages of the prior art, and which permits the slope of the characteristics curves of the output of high voltage to be reduced when the output of high voltage tends to vary as the value of the picture tube current fluctuates.

Another object of the invention is to provide a high voltage producing circuit for television receivers in which a variation in the output of high voltage which occurs when the value of the picture tube current undergoes a change is linear.

Another object of the invention is to provide a high voltage producing circuit for television receivers which causes no forced change to occur in the size of the image on the picture tube screen of the television receiver when the brightness of the screen is varied.

A further object of the invention is to provide a high voltage producing circuit for television receivers which permits power consumption of the control transistor used therein to be reduced, and which makes it possible to use small transistors.

Additional and other objects as well as features and advantages of the invention will become evident from the description set forth hereinafter when considered in conjunction with the accompanying drawings, in which.

Figure 1:
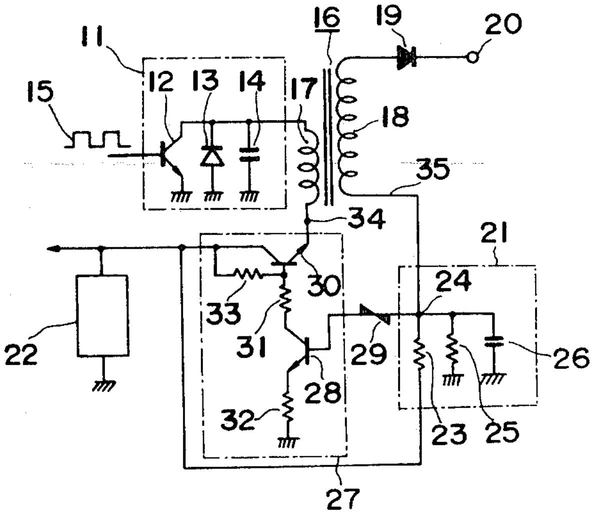
FIG. 1 is a circuit diagram of a first embodiment of this invention.

The first embodiment shown in FIG. 1 will be described. In FIG. 1, there is shown a circuit comprising a pulse supply circuit 11 comprising a transistor 12, a damper diode 13 and a flyback line resonance capacitor 14. In this pulse supply circuit 11, transistor 12 performs a switching operation as drive pulses 15 are supplied to the base thereof; when transistor 12 is fired, a current is passed to a primary winding 17 of a flyback transformer 16 to store magnetic energy therein; when transistor 12 is shut off, the stored magnetic energy is transferred to capacitor 14 first to produce half-cycle pulses of the sine wave form on opposite ends of capacitor 14 and then to absorb pulses of opposite sign following the half-cycle pulses of the sine wave form by firing damper diode 13.

Flyback pulses produced in pulse supply circuit 11 are rectified by a high voltage rectifier diode 19 connected to a secondary winding 18 of flyback transformer 16 after having their voltage increased by flyback transformer 16. The rectified pulses are supplied to the anode of the picture tube through a high voltage output terminal 20.

A detection circuit 21 comprises a resistor 23 connected between a direct current source 22 and the secondary winding 18 of flyback transformer 16, and a resistor 25 and a capacitr 26 connected between a junction 24 between resistor 23 and flyback transformer 16 and ground. In this detection circuit 21, an increase or decrease in the value of a picture tube current $I_o$ supplied from terminal 20 to the picture tube is taken out as a change in the value of direct current voltage at junction 24, so as to thereby vary the value of a base current $I_B$ supplied to a transistor 28 of a control circuit 27 through a resistor element 29 connected between junction 24 and the base of transistor 28. An alternating current component at junction 24 is removed by a capacitor 26.

The manner of operation of transistors 28 and 30 of control circuit 27 undergoes a change which may vary depending on the output of detection circuit 21. This permits automatic control of the direct current voltage supplied from direct current source 22 to pulse supply circuit 11 through the primary winding 17 of flyback transformer 16 to be effected such that variations in the value of output of high voltage depending on the variation in the value of the picture tube current $I_o$ are eliminated. Resistors 31, 32 and 33 in control circuit 27 are for appropriately controlling current flowing through transistor 28.

In case an ordinary resistor whose voltage current characteristics are linear is used as the resistor element 29 in the high voltage producing current shown in FIG. 1, the performance characteristics of the high voltage producing circuit will be such that initially the output of high voltage suddenly decreases when the picture tube current $I_o$ gradually increases in value by starting from zero and then the slope of the characteristic curve of the output of high voltage becomes gentler according to the increase in the value of the picture tube current $I_o$. This phenomenon adversely affects the performance of the television receiver.

Figure 2:
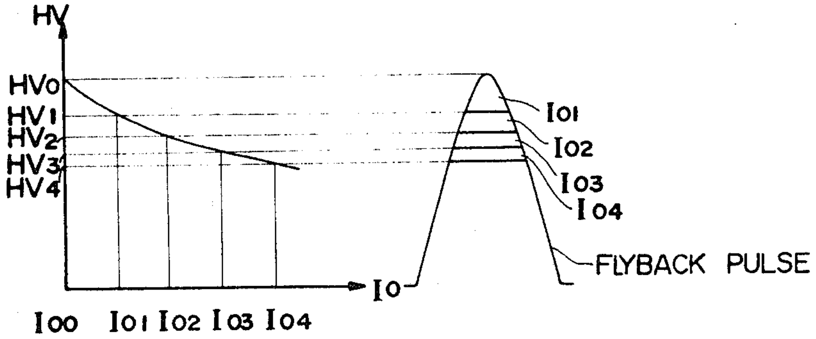
FIG. 2, FIG. 3 and FIG. 4 are diagrams showing characteristics curves in explanation of this invention.

The aforementioned performance characteristics are related to the fact that the pulses having their voltage increased by flyback transformer 16 are not rectangular in wave form but of a wave form such that the pulse width gradually decreases in going from the base to the head of each pulse. The aforementioned relation will be explained with reference to FIG. 2 showing the performance characteristics of the circuit in relation to the pulse wave form. If the pulses of the high voltage supplied from the secondary winding 18 of flyback transformer 16 to high voltage rectifier diode 19 are of the wave form shown at the right side of FIG. 2, the output of high voltage HV will be an output of high voltage $HV_o$ of the value at the same level as the height of the pulse when the picture tube current $I_o$ is zero or $I_{oo}$, with the output of high voltage decreasing from $HV_o$ to $HV_4$ through $HV_1$, $HV_2$ and $HV_3$ according to the increase in the value of the picture tube current $I_o$.

It will thus be seen that the outputs of high voltage $HV_1$ to $HV_4$ represent the voltage values which the output of high voltage HV will have when the value of the picture tube current $I_o$ increases uniformly (in the figure, the picture tube current $I_o$ is shown as increasing in value through $I_{o1}$, $I_{o2}$, $I_{o3}$ and $I_{o4}$ by an equal amount). It will be evident that the change in the voltage values of the output of high voltage HV is non-linear while the change in the value of the picture tube current $I_o$ takes place by an equal amount. This phenomenon is accounted for by the fact that a fixed area of the pulses of high voltage are clipped when the value of the picture tube current $I_o$ increases by an equal amount. This phenomenon inevitably occurs unless the pulses of high voltage are rectangular in wave form.

However, it is impossible to use pulses of high voltage of rectangular wave form, because then the transmission characteristics are required to be planer to frequency of infinity. For this reason, pulses of high voltage of the wave form other than the rectangular wave form have hitherto been used with high voltage producing circuits.

Figure 3:
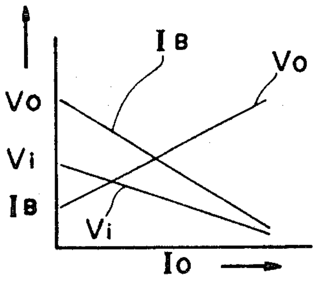

With the circuit arrangement of FIG. 1, a potential $V_i$ at junction 24 undergoes a linear change as shown in FIG. 3 in conformity with a change in the value of the picture tube current $I_o$. Accordingly, when the voltage current characteristics of resistor element 29 are linear, the value of the base current $I_B$ of transistor 28 and the value of supply of the direct current voltage $V_o$ at a junction 34 between the primary winding 17 of flyback transformer 16 and the emitter of a transistor 30 of control circuit 27 undergo a linear change as shown in FIG. 3 in conformity with a change in the value of the picture tube current $I_o$. Thus, the high voltage producing circuit using resistor element 29 of linear voltage current characteristics tends to produce an output of high voltage undergoing the same non-linear change which occurs when the pulses of high voltage of the aforementioned wave form are used.

Figure 4:
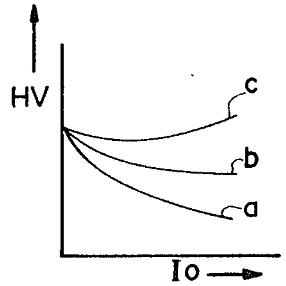

FIG. 4 diagrammatically shows the relation between the value of the picture tube current $I_o$ and the value of the output of high voltage HV which holds when resistor element 29 in the circuit arrangement of FIG. 1 is of linear voltage current characteristics. In the figure, curves *a*, *b* and *c* are obtained when the ratio of the voltage $V_o$ at junction 34 to the voltage $V_i$ at junction 24 in FIG. 1 or $V_o/V_i$ is small (curve *a*), intermediate (curve *b*) and large (curve *c*) respectively.

If the value of the output of high voltage undergoes a non-linear change as aforementioned when the value of the picture tube current $I_o$ undergoes a change, the size of an image on the picture tube screen will show a forced change as the brightness of the screen is varied by operating the brightness control knob of the television receiver, for example.

With the circuit arrangement of FIG. 1, let the output of high voltage appearing at high voltage output terminal 20 when no load is connected thereto (when the picture tube is shut off with the picture tube current being zero in value) be designated $HV_o$, and let the voltage at junction 34 at this time be $V_{co}$ (the value of the supply of direct current voltage supplied to pulse supply circuit 11 through the primary winding 17 of flyback transformer 16), with the following relation holding between $HV_o$ and $V_{co}$:

$$HV_o = A \cdot V_{co} \qquad (1)$$

where *A* is the effective voltage rise of the high voltage producing circuit which is determined by the construction of flyback transformer 16 and flyback time.

Further, let the impedance in the direction of detection circuit 21 from a terminal 35 of the secondary winding 18 of flyback transformer 16 in FIG. 1 be $R_i$, the voltage gain between junction 34 and junction 24 in the figure be $G = V_o/V_i$, and the impedance in the direction of flyback transformer 16 from high voltage output terminal 20 be $R_o$, then an output of high voltage HV with respect to a picture tube current $I_o$ can be expressed by the following formula:

$$HV = A \cdot V_{co} + (A \cdot G \cdot R_i - R_o)\, I_o \qquad (2)$$

In order that the value of the output of high voltage *HV* may remain constant irrespective of a change in the value of the picture tube current $I_o$, the value of the second term of the right side of formula (2) has only to be zero at all times. Thus, it will be evident that the value of the output of high voltage will remain constant irrespective of the change in the value of the picture tube current if the following relation holds at all times:

$$R_o = A \cdot G \cdot R_i \quad (3)$$

It will be noted that the $R_o$ in formula (3) designates the impedance in the direction of flyback transformer 16 from high voltage output terminal 20 which represents the slope of the characteristics curve shown at the left side of FIG. 2. Accordingly, the impedance $R_o$ decreases with an increase in the value of the picture tube current $I_o$ as shown by the characteristics curve of FIG. 2.

Thus, it is necessary to vary the value of the right side of formula (3) to conform to the change in the value of impedance $R_o$ which occurs with a change in the value of the picture tube current $I_o$, in order to satisfy formula (3) at all times.

Figure 8:
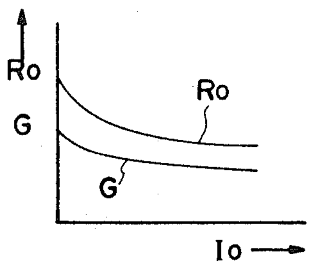

According to the invention, means is provided to satisfy formula (3) at all times by non-linearly varying the voltage gain G between junction 24 and junction 34 in FIG. 1 with respect to the change in the value of the picture tube current $I_o$ (one example of the manner in which the values of $R_o$ and G undergo a change with respect to the change in the value of the picture tube current $I_o$ is shown in FIG. 8) and thereby non-linearly varying the value of the supply of direct current voltage to the circuit 11 which supplies pulses to flyback transformer 16 with respect to the change in the value of the picture tube current $I_o$, whereby the slope of the characteristics curve of the output of high voltage can be reduced with respect to the change in the value of the picture tube current $I_o$. The aforesaid object can be accomplished according to the invention by using a voltage-dependent resistor, such for example as a varistor or a diode of the silicon carbide base, as designated by curve *a* of FIG. 9 as the resistor element 29 connected between the junction 24 in detection circuit 21 and the base of transistor 28 in control circuit 27.

Figure 6:
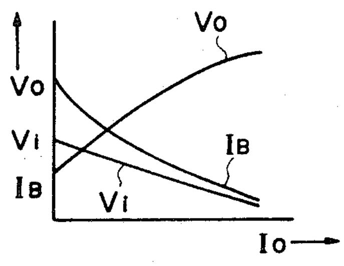
FIG. 6, FIG. 7, FIG. 8 and FIG. 9 are diagrams showing characteristics curves in explanation of the invention.

Thus, when the value of the picture tube current $I_o$ linearly increases with the circuit arrangement of FIG. 1, the potential $V_i$ at the junction 24 in detection circuit 21 linearly decreases in value as shown by a curve $V_i$ of FIG. 6. However, owing to the presence of voltage-dependent resistor element 29 between the junction 24 in detection circuit 21 and the base of transistor 28 in control circuit 27, the base current $I_B$ of transistor 28 non-linearly decreases in value as shown by a curve $I_B$ in FIG. 6 with respect to the change in the value of the picture tube currrent $I_o$. Accordingly, the supply of direct current voltage $V_o$ transmitted to pulse supplying circuit 11 through the primary winding 17 of flyback transformer 16 non-linearly increases in value as shown by a curve $V_o$ in FIG. 6 with respect to the increase in the value of the picture tube current $I_o$.

Figure 7:
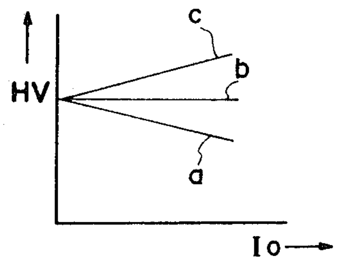

FIG. 7 shows the relation between the picture tube current $I_o$ and the output of high voltage HV which holds when the curve $V_o$ has the characteristics shown in FIG. 6. In the figure, a curve *a* is obtained when the ratio of the potential $V_o$ at junction 34 to the potential $V_i$ at junction 24 or $V_o/V_i$ is small, a curve *b* is obtained when the ratio $V_o/V_i$ is intermediate, and a curve *c* is obtained when the ratio $V_o/V_i$ is large.

From the foregoing description, it will be appreciated that the characteristics curve required in television receivers is the curve *b*. However, the characteristics curve similar to the curve *a* is required sometimes with television receivers of the simple type or the like. This invention is effective to provide such characteristics curve when desired.

Figure 9:
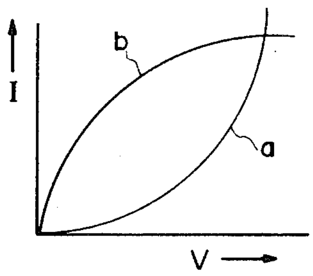

The voltage-dependent resistor element may have characteristics which tend to be represented by a characteristics curve *a* of FIG. 9, and in which current tends to increase at a rate higher than the rate of increase of voltage when the value of the voltage impressed thereon increases. It may also have characteristics which tend to be represented by a characteristics curve *b* of FIG. 9, and in which current tends to increase in value at a rate lower than the rate of increase of voltage when the value of the voltage impressed thereon increases. The resistor element of the latter characteristics includes, for example, incandescent lamps and a resistor between the emitter and the collector of a transistor.

Figure 5:
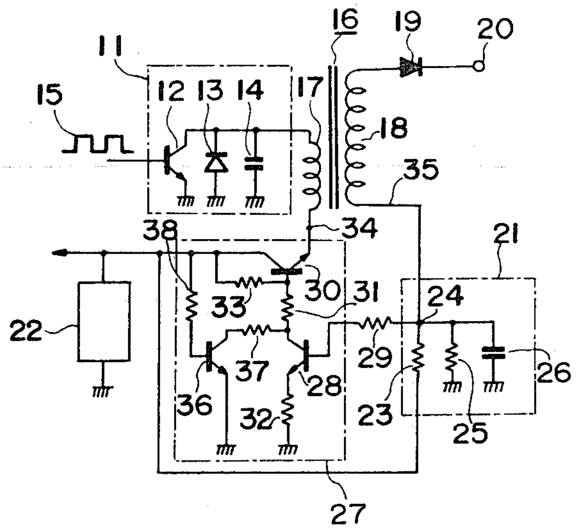
FIG. 5 is a circuit diagram of a second embodiment of the invention.

FIG. 5 shows a second embodiment of the invention in which a voltage-dependent resistor element of the characteristics shown by the curve *b* of FIG. 9 is employed in control circuit 27. The resistor element permits the gain characteristics of control circuit 27 to vary non-linearly with respect to the change in the value of the picture tube current $I_o$, whereby the characteristics of the output of high voltage HV with respect to the picture tube current $I_o$ in the high voltage producing circuit in FIG. 5 can be made similar to the characteristics of the output of high voltage with respect to the picture tube current in the high voltage producing circuit in FIG. 1.

Parts in the circuit arrangement of FIG. 5 similar to those in the circuit arrangement of FIG. 1 are designated by like reference characters and their description is omitted. In FIG. 5, an ordinary resistor, not voltage-dependent resistor element 29 of FIG. 1, is used as the resistor element 29, with a resistor between the collector and the emitter of a transistor 36 serving as the voltage-dependent resistor element. The collector of transistor 36 is connected to the collector of transistor 28 through a characteristics control resistor 37. The emitter of transistor 36 is grounded while the base thereof is connected to direct current source 22 through a bias resistor 38.

Figure 10:
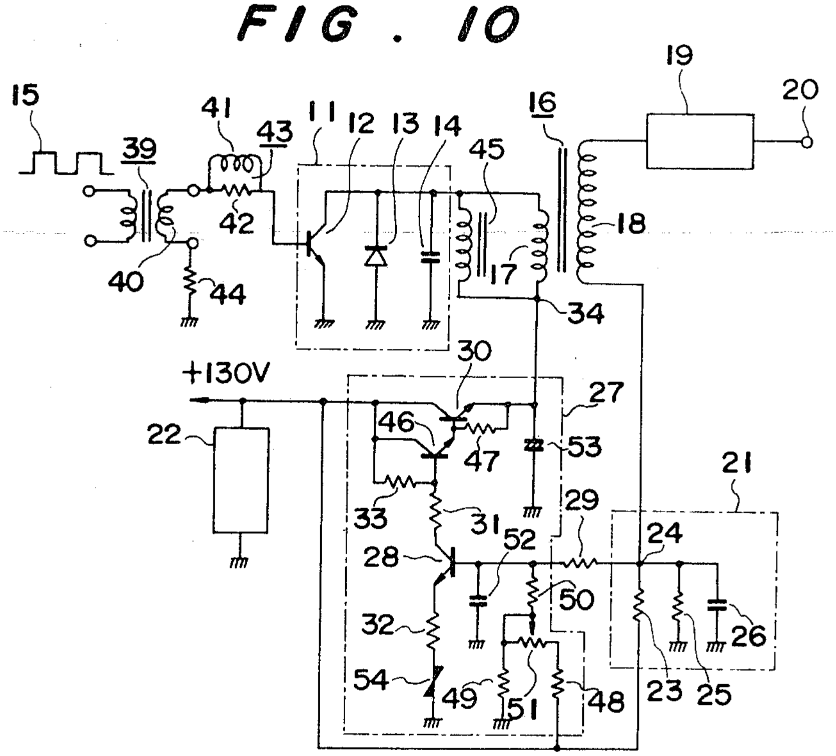
FIG. 10 and FIG. 11 are circuit diagrams of a third embodiment and a fourth embodiment of this invention respectively.

FIG. 10 shows a third embodiment of the invention. Parts in the circuit arrangement of FIG. 10 similar to those in the circuit arrangements of FIG. 1 and FIG. 5 are designated by like reference characters.

In FIG. 10, pulses of rectangular wave form 15 are supplied to a drive transformer 39 as its input from a driving circuit of the previous stage. Drive pulses are supplied from an output winding 40 of drive transformer 39 to an output transistor 12 as its input through a wave form shaping circuit 43 which is a parallel circuit comprising an inductor 41 and a damper resistor 42. 44 is a current adjusting resistor. The drive pulses supplied to transistor 12 as its input cause pulse supply circuit 11 to form between opposite ends of a load inductance 45 a half-wave pulse voltage of the sine wave form which has a height several times greater than the height of the direct current voltage supplied from control circuit 27. The pulse voltage produced at opposite ends of load inductance has its voltage raised by flyback transformer 16, rectified by high voltage rectifier 19 and supplied to the anode of the picture tube through high voltage output terminal 20.

Detection circuit 21 takes out through junction 24 a direct current voltage which corresponds to the picture tube current $I_o$ supplied from terminal 20 to the picture tube, and supplies this direct voltage to control circuit 27 through resistor 29.

Control circuit 27 comprises a voltage control transistor 30, a drive transistor 46 for transistor 30, bias transistors 31, 33 and 47 for transistors 30 and 46, an amplifier transistor 28 bias resistors 48, 49, 50 and 51 for transistor 28, a ripple removing capacitor 52, a direct current source smoothing capacitor 53, an emitter resistor 32 for transistor 28, and a voltage-dependent non-linear element 54.

Since the output of detection circuit 21 varies linearly with respect to the change in the value of the picture tube current $I_o$ as aforementioned, the voltage gain G of control circuit 27 preferably undergoes a non-linear change with respect to the output of detection circuit 21.

In this embodiment, desired characteristics are obtained by inserting in the emitter circuit of transistor 28 non-linear element 54 of the characteristics as shown by the curve *a* of FIG. 9.

Figure 11:
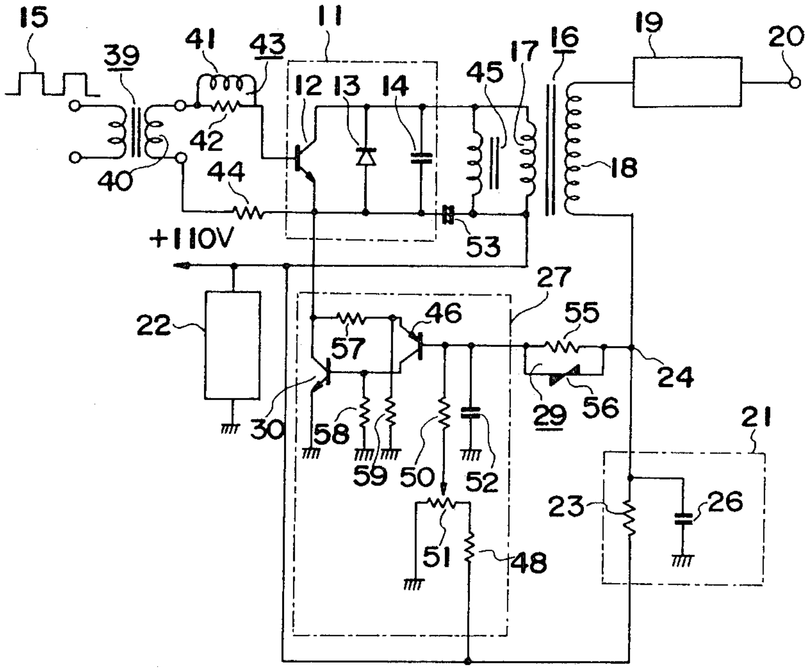

FIG. 11 shows a fourth embodiment of the invention. The circuit arrangement of FIG. 11 is distinguished from that of FIG. 10 in that control circuit 27 is inserted between the emitter of switching transistor 12 and ground, not in the collector circuit of transistor 12, and that resistor element 29 through which the output of detection circuit 21 is supplied to control circuit 27 is formed by a parallel circuit comprising a resistor 55 and a non-linear resistor element 56. With this arrangement, the amplifier transistor 28 shown in FIG. 10 is done without, thereby permitting the circuit to be simplified. Besides, since non-linear resistor element 56 may be of any type that is available at the market, thereby permitting improved characteristics to be obtained economically.

Figure 14:
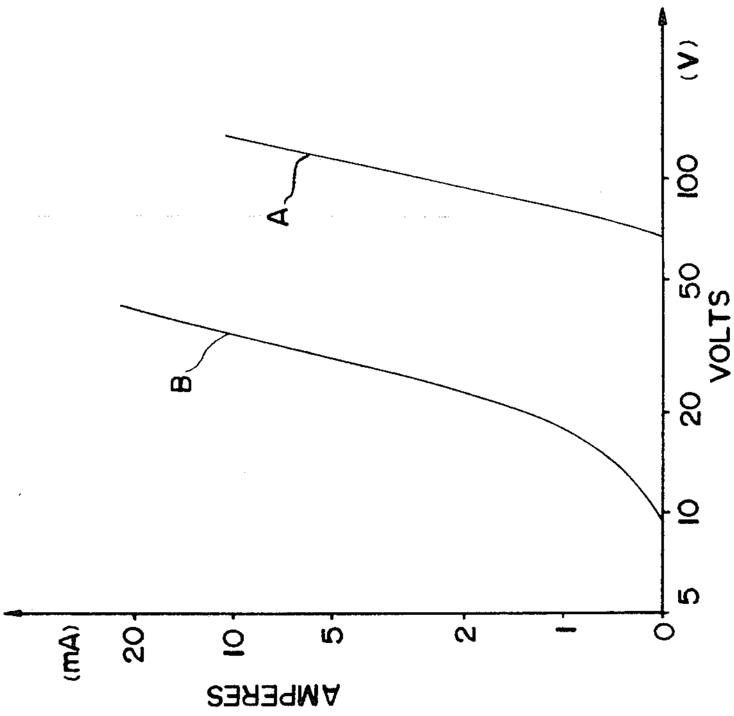
FIG. 14 is a diagram showing characteristics curves of the non-linear element used in the various embodiments of the invention.

When the circuit constants of the embodiment of FIG. 10 were as follows and a non-linear element of the characteristics shown by a curve B in FIG. 14 was used, it was possible to establish between the picture tube current $I_o$ and the output of high voltage HV the relation shown by a curve B in FIG. 12.

| | |
|---|---|
| Resistor 23 | 100 KΩ |
| 25 | 33 KΩ |
| 29 | 220 KΩ |
| 31 | 15 KΩ |
| 32 | 3.3 KΩ |
| 33 | 15 KΩ |
| 42 | 220 Ω |
| 44 | 1 Ω |
| 47 | 470 Ω |
| 48 | 470 K Ω |
| 49 | 330 K Ω |
| 50 | 220 K Ω |
| 51 | 1 MΩ(variable resistor) |
| Capacitor 14 | 0.0056 μF |
| 26 | 0.1 μF |
| 52 | 0.001 μF |
| 53 | 47 μF |
| Inductor 41 | 10 μH |
| 45 | 1.8 mH |
| Diode 13 | SB2C |
| Transistor 12 | 2SC937 |
| 28 | 2SC856 |
| 30 | 2SD198 |
| 46 | 2SC685A |
| Non-linear element 54 | TVS 1/2 D233L |

When the circuit constants of the embodiment of FIG. 11 were as follows and a non-linear element of the characteristics shown by a curve A in FIG. 14 was used, it was possible to establish between the picture tube current $I_o$ and the output of high voltage HV the relation shown by a curve A in FIG. 12.

| | |
|---|---|
| Resistor 23 | 91 KΩ |
| 42 | 100 Ω |
| 44 | 5 Ω |
| 48 | 330 KΩ |
| 50 | 47 KΩ |
| 51 | 2 KΩ(variable resistor) |
| 55 | 220 KΩ |
| 57 | 1 KΩ |
| 58 | 1 KΩ |
| 59 | 2.2 KΩ |
| Capacitor 14 | 0.0047 μF |
| 26 | 0.47 μF |
| 52 | 0.1 μF |
| 53 | 47 μF |
| Inductor 41 | 10 μH |
| 45 | 1.4 mH |
| Diode 13 | SB2C |
| Transistor 12 | 2SC937 |
| 30 | 2SD198 |
| 46 | 2SA612 |
| Non-linear element 56 | TVL 3/4 D380L |

Figure 12:
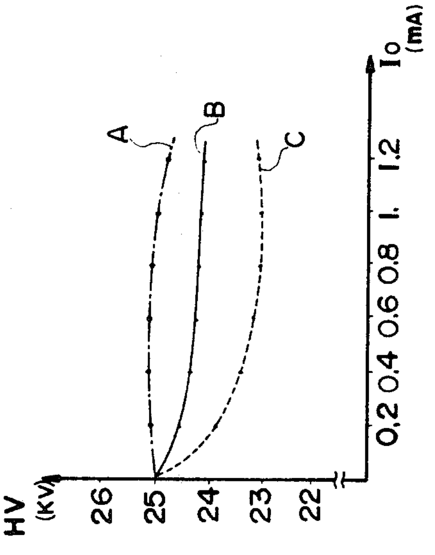
FIG. 12 and FIG. 13 are diagrams showing characteristics curves of the embodiments shown in FIG. 10 and FIG. 11 respectively.

A curve C in FIG. 12 is shown as an example of curves showing the relation between the picture tube current $I_o$ and the output of high voltage HV when this invention is not incorporated in the high voltage producing device of television receivers.

Figure 13:
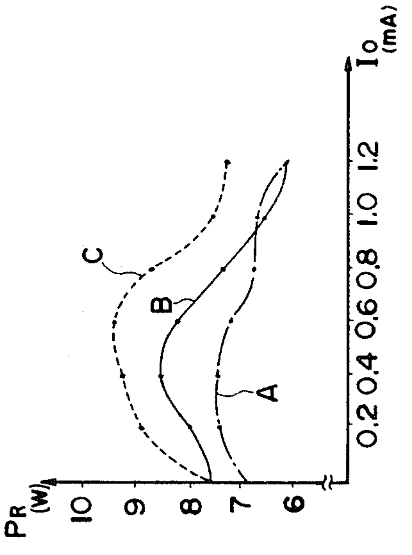

A curve A and a curve B in FIG. 13 show the relation between a power loss $P_R$ of control transistor 30 and the picture tube current $I_o$ of the embodiments shown in FIG. 10 and FIG. 11 respectively. A curve C shows the relation between the power loss $P_R$ of control transistor 30 and the picture tube current $I_o$ in the high voltage producing circuit of television receivers in which this invention is not incorporated. The curve C shows that the power loss is increased with the picture tube current $I_o$ being in a range of from 0.2 to 0.6 milliampere. However, if this invention were incorporated in the high voltage producing circuit, the non-linear element would operate such that the voltage reduction in transistor 30 would be reduced in this range, so that power loss would be reduced and the use of a small transistor as transistor 30 would be permitted.

While the invention has been shown and described with reference to preferred embodiments thereof, it is to be understood that the invention is not limited to the specific arrangement and the component parts of the circuits shown and described and that many changes and modifications may be made therein without departing from the spirit and scope of the invention.

What is claimed is:

1. A high voltage producing circuit for television receivers comprising a pulse supply circuit receiving a supply of drive pulses for performing a switching operation and producing flyback pulses, a direct current source for supplying a direct current voltage to said pulse supply circuit, a flyback transformer for increasing the voltage of said flyback pulses, rectifier means for rectifying the output voltage of said flyback transformer, a high voltage output terminal through which a rectified output of high voltage is transmitted to a picture tube, a detection circuit adapted to detect a variation in the value of a picture tube current supplied through said high voltage output terminal to the picture tube and produce a direct current voltage of the value corresponding to the variation in the value of the picture tube current, and a control circuit comprising at least one voltage-dependent non-linear element adapted to receive a supply of the direct current voltage produced by said detection circuit and vary the value of the direct current voltage supplied from said direct current source to said pulse producing circuit, said control circuit being constructed and operating such that the direct current voltage supplied to the pulse supply circuit from the direct current source undergoes a non-linear variation in value with respect to a variation in the value of the direct current voltage produced by the detection circuit.

2. A high voltage producing circuit as set forth in claim 1 wherein said control circuit further comprises a first transistor, a collector of which is connected to said direct current source and an emitter of which is connected to said pulse producing circuit, and a second transistor, a collector of which is connected to a base of the first transistor and an emitter of which is connected to ground, said voltage-dependent non-linear element being connected between a base of said second transistor and said detection circuit.

3. A high voltage producing circuit as set forth in claim 1 wherein said control circuit further comprises a first transistor comprising a collector connected to said direct current source and an emitter connected to said pulse supply circuit, a second transistor having a collector connected to a base of said first transistor, an emitter connected to ground and a base connected to said detection circuit, and a third transistor having a collector connected to the collector of said second transistor and an emitter connected to ground, and a resistor between the collector and the emitter of said third transistor is used as the voltage-dependent non-linear element.

4. A high voltage producing circuit as set forth in claim 1 wherein said control circuit further comprises a first transistor comprising a collector connected to said direct current source and an emitter connected to said pulse supply circuit, and a second transistor having a collector connected to a base of said first transistor, an emitter connected to ground and a base connected to said detection circuit, said voltage-dependent non-linear element being connected in series between the emitter of said second transistor and ground.

5. A high voltage producing circuit as set forth in claim 1 wherein said direct current source and said pulse supply circuit are connected in series with each other, and said control circuit is connected substantially in series between said pulse supply circuit and ground.

6. A high voltage producing circuit as set forth in claim 5 wherein said control circuit comprises a transistor comprising a collector connected to said pulse supply circuit, an emitter connected to ground and a base connected to said detection circuit through said voltage-dependent non-linear element.

* * * * *